United States Patent Office 2,833,659
Patented May 6, 1958

2,833,659

METHOD OF MAKING CERAMIC PRODUCT AND MOLDABLE MIX THEREFOR

William H. Bauer, Piscataway Township, Middlesex County, N. J., assignor to G. & W. H. Corson, Inc., Plymouth Meeting, Pa., a corporation of Delaware No Drawing. Application November 9, 1953
Serial No. 391,113

15 Claims. (Cl. 106—71)

The present invention relates to a method of making a ceramic body; and, more particularly, it relates to a method of making a ceramic body such as heavy clay ceramic products, including brick, sewer pipe, tile, terra cotta; red-burned pottery, and the like. The invention also relates to a novel moldable mix from which such a ceramic body may be made.

One of the chief problems in this country in connection with the production of clay ceramic products, such as brick, sewer pipe, tile, terra cotta, red-burned pottery, and the like, is the availability of surface clay or shale materials from which such products are normally made. While some sections of the country offer a plentiful supply of high grade materials, in many of the more highly populated areas there is a severe shortage of clays and shales of suitable properties for the production of an acceptable product. Because of this, there has been considerable investigation in recent years for inexpensive materials which may replace a portion of the clay and/or shale in the manufacture of ceramic products.

Power plants and the like which consume large quantities of coal, especially powdered coal, produce increasingly large quantities of two types of waste material; namely, coal ash dust, commonly called fly ash, and slag. Fly ash is the finely-divided ash material which is carried from the furnace by stack gases and is collected as it leaves the furnace in electrostatic precipitators, or other type of collectors. The portion of the ash that does not leave the furnace with the stack gases is cooled in the molten state, for example, by being dropped into water underneath the furnace, and this portion of the ash is commonly called slag and will be referred to herein as "coal-ash slag" or merely as "slag." The composition of the fly ash and of the slag obtained from the same coal is generally very close except as to carbon content, since the fly ash normally contains from about 1% to about 25% of carbon, whereas the slag is substantially free of carbon. The carbon content of the fly ash represents the amount of original coal that did not burn during the combustion of the main body of the coal.

It has been found that fly ash is not only eminently suitable as a complement to the diminishing clay and shale supplies in the manufacture of clay ceramic products, but that its use as an ingredient in the manufacture of clay ceramic products provides many advantages. Thus, aside from the fact that it is an inexpensive, year around raw material, it has been found that its presence in the mix from which the ceramic product is made prevents laminations which often occur during extrusion of the plastic mix in the formation of the product, lowers the required firing temperature by virtue of the fact that it acts as a flux with many clays and shales, provides a deeper coloration in the final ceramic product with many clays and shales and reduces drying and firing shrinkage to the extent that it is present in the body since it is a prefired material. Coal-ash slag may also be employed in conjunction with the fly ash to replace a portion of the clay and/or shale.

The use of fly ash in conjunction with clay and/or shale in the manufacture of clay ceramic products has, however, given rise to one substantial disadvantage which has held back considerably the commercial production of such products. It has been found that during drying of a body containing fly ash and clay or shale an unsightly surface deposit is formed on the body which masks the normal ceramic color giving the appearance of an inferior product. The phenomenon has been referred to as "scumming." Although scumming, as is well known, may occur to a slight extent with certain clays or shales even when no fly ash is employed, scumming ossasioned by the use of fly ash appears to be of a different nature from that of common scumming because of its intensity, because of the fact that clays which normally exhibit no tendency to scum do so substantially when fly ash is mixed therewith and the plastic mix dried, and because conventional "anti-scumming" agents have no significant effect on this scumming. It is believed that, since severe scumming takes place when fly ash, a seemingly inert material, is mixed with a normally non-scumming clay or shale, a reaction occurs between these materials which liberates sufficient soluble materials that will migrate to the surface of the body during drying being deposited thereon when the water evaporates.

It is the principal object of the present invention to provide a method of making ceramic bodies of the type referred to from mixtures comprising fly ash and clay and/or shale wherein the above-described scumming is substantially reduced or eliminated altogether.

It is another object of the present invention to provide a moldable mixture comprising fly ash and clay and/or shale which can be formed into a ceramic shape and dried without the formation of unsightly deposits on the surface thereof.

Other objects will become apparent from a consideration of the following specificaton and claims.

It has been found that the inclusion of a small amount of lignosulphonic acid or a water-soluble salt thereof with the ingredients comprising fly ash and clay and/or shale substantially reduces or eliminates the scumming which would normally occur during drying of the fly ash, clay and/or shale body. The method of the present invention comprises, therefore, intimately mixing with the fly ash and the clay and/or shale a small amount of a lignosulphonic acid compound selected from the group consisting of lignosulphonic acid and the water-soluble salts thereof, and water to thoroughly distribute the lignosulphonic acid compound throughout the mass and to form a moldable plastic mass, shaping the mass, drying the shaped mass and firing to provide a ceramic body. The moldable mix comprising the fly ash, clay and/or shale, lignosulphonic acid compound and water may, therefore, be shaped and dried, following conventional procedures, without, however, formation of the unsightly severe scum deposit which would normally occur if the lignosulphonic acid compound were not employed.

The amount of fly ash employed in making up the ceramic body in accordance with the present invention may vary widely depending in part upon the properties desired in the final product and upon the availabilty of the clay and/or shale in a particular area. Thus, it has been found that amounts between about 5% and about 10% prevent laminations which often occur during the extrusion of the ceramic mix during the shaping of the body. Greater amounts may be employed to lower the firing temperature required since fly ash serves as a fluxing agent with many clays and shales. Also the more fly ash employed the deeper the color of the final ceramic product with many clays and shales. Thus, for these latter two purposes where it is desired to substitute as much fly ash as possible for the clay and/or shale, amounts of fly ash as high as about 75% may be employed. For most purposes it is preferred to use between about 20 and about 60% of fly ash. The above figures refer to the percent, by weight, of the fly ash based on combined weight of the solid materials employed.

As is well known, one of the normal ingredients of any mix from which clay ceramic products are to be made is clay or shale or a mixture of clay and shale. The present invention is not concerned with the particular type of clay and/or shale used, and any clay and/or shale which is normally employed in the manufacture of clay ceramic products of the type mentioned above as well as low grade clays (including loams) and shales which are made usable by the inclusion of the fly ash may be employed in accordance with the present invention.

The amount of clay and/or shale employed may vary considerably, and the amount selected may be governed by the same considerations mentioned above in connection with the proportion of fly ash. Thus, the amount of clay and/or shale may range from as low as about 10%, by weight, up to about 95%; preferably between about 20 and about 80%.

Other materials may be employed in addition to the fly ash and clay and/or shale in making the ceramic body as is customary in the manufacture of heavy clay ceramic products. For example, a minor amount of grog, that is, crushed ceramic ware, may be employed, if desired. Generally, where grog is employed it will not make up more than about 10%, by weight, of the combined weight of solid materials. Coal-ash slag may also be employed in preparing the ceramic body. Coal-ash slag also represents a readily available, inexpensive material which can replace a portion of the conventional clay and/or shale. It has been found that the slag may be employed in amounts up to about 50%, by weight, based upon the combined weight of the solid materials. Preferably, however, where slag is employed, it will not make up more than about 30%, by weight, of the combined weight of the solid materials. A small amount of bentonite may also be included in the mix where needed to provide added plasticity and added green strength. Generally, when bentonite is employed, it will not make up more than about 3%, by weight, of the combined weight of the materials.

The primary feature of the present invention, as stated, is the incorporation of a small amount of a lignosulphonic acid compound in the mix comprising the fly ash and the clay and/or shale. The lignosulphonic acid compound may, as stated, be the free lignosulphonic acid or may be any one or more of the water-soluble salts thereof. During the manufacture of chemical wood pulp, for example, through the use of calcium bisulphite, the lignin content of the wood is converted to calcium lignosulphonate. This salt can be recovered, and can be converted to the free acid or to other alkaline earth metal salts such as the magnesium salt, or to the alkali metal salts such as the sodium, potassium and lithium salts. The ammonium salt of lignosulphonic acid is also available. Mixtures of two or more lignosulphonic acid compounds may be employed if desired. In addition, it is not necessary that the relatively pure compounds be employed, and, in fact, economy may require the use of relatively crude waste liquors or extracts containing one or more of the lignosulphonic acid compounds. For example, the waste liquor from the sulphite process will contain calcium lignosulphonate in solution, and this liquor may be used in accordance with the present invention. Thus, there is a material sold by the Lockhaven Paper Company called "Clarion Extract" which is a 50% solution of calcium lignosulphonate in water produced from the waste sulphite liquor. There is also available a mixed calcium and magnesium lignosulphonate in the form of a dry powder known as "goulac" manufactured by the American Gum Products Company. Of the lignosulphonic acid compounds available, the alkaline earth metal salts, particularly the calcium salt, are preferred. The lignosulphonic acid compound may be employed in the form of an aqueous solution or as a solid since, in any event, the water employed in preparing the moldable mass will dissolve the compound and insure its distribution throughout the mix. It is preferred practice, however, actually to add the compound as an aqueous solution.

With respect to the amount of lignosulphonic acid compound employed, it has been found that the use of a very small amount of such material significantly reduces the aforementioned scumming. Thus, a significant improvement may be realized by the inclusion of as little as about .01% thereof, by weight, based on the weight of the solid components of the mixture. While amounts as high as about 5% may be employed, no significant advantage is obtained over the use of about 2% and preferably, therefore, the amount of lignosulphonic acid compound will not exceed about 2%. For optimum results at least about .025% is preferred.

In preparing the ceramic product in accordance with the present invention, conventional procedures may be followed. Thus, the various ingredients may be initially mixed in a dry state, for example, in a dry pan. On the other hand, the ingredients may be mixed in the wet state by adding water and employing, for example, a wet pan, or edge runner type mill, or pug mill. When the ingredients are first dry mixed, the mixture may be further mixed in a wet state following the addition of water in, for example, a pug mill. At any rate, there must ultimately be formed an intimate mixture of all the ingredients with sufficient water to provide a moldable, plastic mass.

The amount of water which is used to form the moldable mass will be sufficient, as is well known, to permit the resulting mass to be shaped in the equipment used. When a dry press is used, for example, the water content may be as low as about 6 to 8%. In the use of extrusion machines, on the other hand, for example, the conventional de-airing machine, the water content of the mass may be somewhat higher and may range up to about 25%. The mixing step, aside from the inclusion of the lignosulphonic acid compound in accordance with the present invention, and the shaping step follow conventional practices and will present no problem to those skilled in the art.

The drying of the shaped body may be accomplished in any conventional manner, for example, by placing the wet, shaped body on racks and passing these through a tunnel dryer in which waste heat gases are employed to evaporate the water. During drying the temperature employed will not exceed the boiling point of water. The important advantage of the present invention is that, during drying the unsightly scumming normally encountered in drying fly ash-containing clay or shale bodies, does not occur.

Following drying, the shaped body is fired at a temperature which may range from about 1600° F. to about 2300° F. Firing can be carried out in conventional kilns, either periodic or continuous. The only departure from conventional firing procedures may be in the case where relatively large amounts of fly ash which contain a high carbon content are employed, in which case some time must be consumed in burning out the carbon before permitting the temperature of the kiln to rise to a point where vitrification starts. For example, in the manufacture of brick when the fly ash selected contains more than about 20% of carbon and the body contains approximately 50% fly ash, it is desirable to subject the body to a low temperature firing period lasting from 5 to 6 hours or more depending upon the temperature. When a temperature of 1500° F. is used, 5 hours is sufficient, but when a temperature of 1000° F. is used, as much as 18 hours may be required. After the carbon has been substantially removed, the firing cycle can be continued following the pattern typical for carbon-free ceramic materials. Instead of using a continuous kiln with a relatively short time cycle, a conventional periodic kiln may be employed in which the time cycle may extend for many days or weeks. In an operation of this kind, there is sufficient soaking time to eliminate any carbon before vitrification. One of the unique characteristics of ceramic bodies prepared from fly ash, and from fly ash and coal-ash slag, is the decreased shrinkage during drying and firing. This results in numerous manufacturing advantages since the product can be dried and fired very rapidly and the resulting treated material is substantially free from distortion, cracks and breakage.

The present invention will be more clearly understood from a consideration of the following specific examples which are given for the purpose of illustration and are not intended to limit the scope of the invention in any way:

Example I

A mixture consisting of 50% fly ash and 50% of a low grade surface clay obtained from the Philadelphia area is divided into four portions. To one portion is added .25% of a 10% aqueous solution of calcium lignosulphonate, to another portion is added .50% of a 10% aqueous solution of calcium lignosulphonate and to the third portion was added 1% of a 10% aqueous solution of calcium lignosulphonate. Nothing was added to the fourth portion. Sufficient water was added to each portion to form a moldable plastic mass, and each portion was shaped into bricks. The bricks were dried in conventional driers at a temperature of about 180° F. following which they were fired at a temperature ranging from about 1900° F. to 2000° F. During drying none of the bricks prepared from the treated portions exhibited any scumming, whereas, the untreated control bricks showed severe scumming.

To three other portions of the stated mixture were added .25%, .5% and 1% of barium carbonate, a conventional anti-scumming agent. These samples were similarly shaped, dried and fired, and they were all found to have scummed badly.

Example II

A mixture of 50% of fly ash and 50% of a surface clay from the Baltimore area was divided into five portions. To four of these portions were added .25%, .5%, 1% and 1.5%, respectively, of a 10% aqueous solution of calcium lignosulphonate. None was added to the fifth portion. Bricks were prepared from each portion in the manner generally described in Example I. The bricks from the untreated portion were particularly scummed, whereas the bricks from the treated portions progressively decreased in scumming with the 1% and 1.5% series being completely devoid of scumming.

Example III

A mixture of 50% of fly ash and 50% of shale from the Philadelphia area was divided into five portions. To four portions were added .25%, .5%, 1% and 1.5%, respectively, of a 10% aqueous solution of sodium lignosulphonate. None was added to the fifth portion. Bricks were prepared from each portion following the procedure generally outlined in Example I. The bricks from the untreated portion were particularly scummed, whereas, with the bricks from the treated portions, the scumming decreased until the 1% and 1.5% series were completely devoid of scum.

Considerable modification is possible in the selection of the various ingredients and amounts thereof as well as in the particular procedures followed in preparing moldable ceramic mixes and in making ceramic bodies without departing from the scope of the present invention.

I claim:

1. In the manufacture of a heavy clay ceramic body from fly ash and a material selected from the group consisting of clays and shales, and containing between about 10% and 95% by weight, based on the solids in the mix, of the selected material, the step which comprises intimately mixing with said fly ash and said selected material, water and between about 0.01% and about 5%, by weight, based on the solids in the mix, of a lignosulphonic acid compound selected from the group consisting of lignosulphonic acid and water-soluble salts thereof.

2. The method of claim 1 wherein the lignosulphonic acid compound is a water-soluble salt of lignosulphonic acid.

3. The method of claim 2 wherein the salt is an alkaline earth metal lignosulponate.

4. The method of claim 3 wherein the salt is calcium lignosulphonate.

5. The method of making a heavy clay ceramic body which comprises mixing fly ash, a material selected from the group consisting of clays and shales, and containing between about 10% and about 95%, by weight, based on the solids in the mix, of the selected material, water and a lignosulphonic acid compound selected from the group consisting of lignosulphonic acid and water-soluble salts thereof in an amount between about 0.01% and about 5%, by weight, based on the solids in the mix, to form a moldable plastic mass, shaping the mass, drying the shaped mass and firing.

6. The method of claim 5 wherein the lignosulphonic acid compound is a water-soluble salt of lignosulphonic acid.

7. The method of claim 6 wherein the salt is an alkaline earth metal lignosulphonate.

8. The method of claim 7 wherein the salt is calcium lignosulphonate.

9. A moldable plastic mass from which heavy clay ceramic bodies may be prepared comprising fly ash, a material selected from the group consisting of clays and shales in an amount between about 10% and about 95%, by weight, based on the solids in the mass, water and a lignosulphonic acid compound selected from the group consisting of lignosulphonic acid and water-soluble salts thereof in an amount between about 0.01% and about 5%, by weight, based on the solids in the mass.

10. The product of claim 9 wherein said lignosulphonic acid compound is a water-soluble salt of lignosulphonic acid.

11. The product of claim 10 wherein said salt is an alkaline earth metal salt of lignosulphonic acid.

12. The product of claim 11 wherein said salt is calcium lignosulphonate.

13. The method of claim 1 wherein said material selected from the group consisting of clays and shales makes up between about 20% and about 80%, by weight, of the combined solid materials.

14. The method of claim 5 wherein said material selected from the group consisting of clays and shales makes up between about 20% and about 80%, by weight, of the solids in the mix.

15. The product of claim 9 wherein said material selected from the group consisting of clays and shales is present in an amount between about 20% and about 80%, by weight, based on the solids in the mass.

References Cited in the file of this patent

UNITED STATES PATENTS

| | | |
|---|---|---|
| 1,228,465 | Minton | June 5, 1917 |
| 1,278,164 | Kerr | Sept. 10, 1918 |
| 1,327,758 | Frohman | Jan. 13, 1920 |
| 2,247,120 | Fitzgerald | June 24, 1941 |
| 2,287,538 | Schusterius | June 23, 1942 |
| 2,576,565 | Brown | Nov. 27, 1951 |

FOREIGN PATENTS

| | | |
|---|---|---|
| 524,513 | Great Britain | Aug. 8, 1940 |
| 653,070 | Great Britain | May 9, 1951 |